US006301229B1

(12) United States Patent
Araujo et al.

(10) Patent No.: US 6,301,229 B1
(45) Date of Patent: Oct. 9, 2001

(54) DISTRIBUTION OF PROTOCOL PROCESSES FROM NETWORK ELEMENTS TO END STATIONS

(75) Inventors: Kenneth Araujo, Sunnyvale; Peter Si-Sheng Wang, Cupertino, both of CA (US); Cheng Chen, Holmdel, NJ (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/056,281

(22) Filed: Apr. 7, 1998

(51) Int. Cl.[7] ................................................. H04L 12/66
(52) U.S. Cl. ........................... 370/252; 370/401; 370/410
(58) Field of Search ................................... 370/401, 702, 370/410, 469, 522, 524, 252, 352, 355, 356

(56) References Cited

U.S. PATENT DOCUMENTS

| | | | |
|---|---|---|---|
| 4,965,798 | | 10/1990 | Mostafa et al. .......................... 370/79 |
| 5,563,882 | | 10/1996 | Bruno et al. ............................ 370/62 |
| 5,583,997 | | 12/1996 | Hart ................................ 395/200.15 |
| 5,657,452 | | 8/1997 | Kralowetz et al. ............. 395/200.57 |
| 5,680,392 | | 10/1997 | Semaan ................................ 370/261 |
| 5,732,071 | | 3/1998 | Saito et al. ............................ 370/255 |
| 5,745,884 | | 4/1998 | Carnegie et al. ........................ 705/34 |
| 5,768,525 | | 6/1998 | Kralowetz et al. ............. 395/200.58 |
| 5,790,548 | * | 8/1998 | Sistanizadeh et al. ................ 370/401 |
| 5,818,838 | | 10/1998 | Backes et al. .......................... 370/390 |
| 5,822,523 | | 10/1998 | Rothschild et al. ............. 395/200.17 |
| 5,867,660 | | 2/1999 | Schmidt et al. ................. 395/200.57 |
| 5,870,386 | | 2/1999 | Perlman et al. ....................... 370/256 |
| 5,918,019 | | 6/1999 | Valencia .......................... 395/200.57 |
| 5,930,258 | * | 7/1999 | Solis et al. ............................ 370/401 |
| 5,959,988 | * | 9/1999 | Bjorkman et al. .................... 370/389 |
| 5,982,767 | * | 11/1999 | McIntosh .............................. 370/352 |
| 5,982,783 | * | 11/1999 | Frey et al. ............................ 370/467 |
| 6,009,101 | * | 12/1999 | Schoo et al. ........................... 370/400 |
| 6,029,203 | * | 2/2000 | Bhatia et al. .......................... 709/244 |
| 6,041,054 | * | 3/2000 | Westberg ............................... 370/389 |
| 6,157,649 | * | 12/2000 | Peirce et al. .......................... 370/401 |
| 6,208,656 | * | 3/2001 | Hraster et al. ........................ 370/401 |

OTHER PUBLICATIONS

Arunkumar, N. et al., "Layer Two Tunneling Protocol (L2TP) over AAL5 and FUNI", 3Com Corporation, Mar. 25, 1997, printed from world wide web site "http://www.internic.net/internet-drafts/draft-ietf-pppext-l2tp-aa15-funi-00.txt", 11 pages.

Simpson, W. (Editor), "PPP in HDLC-like Framing", Request for Comments 1662, Point-to-Point Protocol Working Group of the Internet Engineering Task Force (IETF), Jul. 1994, printed from world wide web site "http://ds.internic.net/rfc/rfc1662.txt", 53 pages.

Hamzeh, K. et al., "Layer Two Tunneling Protocol 'L2TP'", Nov. 1997, printed from world wide web site "http://www.internic.net/internet-drafts/draft-ietf-pppext-l2tp-08.txt", 132 pages.

Simpson, W. (Editor), "The Point-to-Point Protocol (PPP)", Request for Comments 1661, Point-to-Point Protocol Working Group of the Internet Engineering Task Force (IETF), Jul. 1994, printed from world wide web site "http://ds.internic.net/rfc/rfc1661.txt", 108 pages.

* cited by examiner

Primary Examiner—Min Jung
(74) Attorney, Agent, or Firm—McDonnell Boehnen Hulbert & Berghoff

(57) ABSTRACT

A network intermediate device interacts with a remote network element and performs the control plane interactions for a communication protocol used on a network segment between the network intermediate device and the destination, and interacts with customer premises equipment CPE to offload data plane transactions according to the protocol normally performed by the network intermediate device to the CPE, without the CPE needing to be aware of the complexities of the protocol involved. By distributing certain recurring packet data processing functions, like appending headers and removing headers, to the endpoints, the packet processing at the network intermediate devices is streamlined and processing bottlenecks are alleviated.

42 Claims, 7 Drawing Sheets

DISTRIBUTION OF PROTOCOL PROCESSES FROM NETWORK ELEMENTS TO END STATIONS

RELATED APPLICATIONS

This application is related to non-provisional application, entitled "Point-to-Point Protocol With A Signaling Channel," by inventors, Kenneth Araujo and Peter Si-Sheng Wang, having Ser. No. 09/056,280, and filing date Apr. 4, 1998, which was filed on the same day as the instant application now U.S. Pat. No. 6,118,785; and to non-provisional application, entitled "Session Establishment For Static Links In Point-to-Point Protocol Sessions," by inventors, Kenneth Araujo and Peter Si-Sheng Wang having Ser. No. 09/056,258, and filing date Apr. 7, 1998, which was filed on the same day as the instant application now U.S. Pat. No. 6,112,245; and to non-provisional application, entitled "Enabling Multicast Distribution Efficiencies In A Dialup Access Environment," by inventors Kenneth Araujo, Peter Si-Sheng and Cyndi Jung having Ser. No. 09/056,284, and filing date Apr. 7, 1998, which was filed on the same day as the instant application now U.S. Pat. No. 6,097,720.

BACKGROUND OF THE INVENTION

1. Field of the Invention

The present invention relates to data communications, and more particularly to techniques for streamlining the processing of data packets in network intermediate devices, such as concentration/multiplexing equipment in a telephone access provider network.

2. Description of Related Art

More and more consumers are connecting to the Internet through modems which are coupled to the public switched telephone network. The companies that provide access to the public switched telephone network are often referred to as access providers. The access providers include networks for transmitting voice and data among endpoints coupled to the network. For example, local loops connect modems at customer premises to a central office switch on the public switched telephone network. At the central office switch, the telephone connection is routed to its destination, either directly or through other equipment in the network. Often a network intermediate device in the access provider's network that receives data from an endpoint performs some protocol processing functions on the data before forwarding the data towards a remote network element, such as another endpoint or another network intermediate device. The protocol processing functions often have a control phase and a data phase. The control phase involves negotiating with the remote network element. As a result of the control phase, some data phase actions, like segmentation and reassembly, and applying or removing control data, typically have to be performed on the data as it is transported to the network.

As data traffic increases, the access providers that provide access to Internet Service Providers ISP across their telephone networks are diverting the data traffic off of the voice networks into networks more suited for data traffic or packet switched traffic. Thus, the central office switches are configured with a concentrator and multiplexer for data traffic, which performs these protocol processing functions. In this way, the communication of the data traffic from the central office switch to a remote access server or other destination is processed by the concentrator/multiplexer to optimize use of the access provider's available bandwidth. For example, access providers are beginning to deploy equipment which terminates calls, extracts packets and encapsulates the packets within logical connections in a tunnel.

The Point-to-Point Protocol, as it is defined, is used for transporting multi-protocol datagrams over point-to-point links, such as those between customer premises equipment CPE and a remote access server RAS for an ISP. One version of the PPP is described in Request For Comments RFC 1661, published July 1994 by the Point-to-Point Protocol Working Group of the Internet Engineering Task Force IETF. The PPP consists of a specification for encapsulating multi-protocol datagrams, a link control protocol LCP for establishing, configuring and testing the datalink connection, and a family of network control protocols NCPs for establishing and configuring different network layer protocols. According to the PPP, network layer packets are referred to as datagrams. The datagrams are passed to the datalink layer in which they are encapsulated according to the PPP in a packet having a packet header. The packet including the PPP fields and the datagram is passed to the physical layer at which framing, such as HDLC-like framing, is appended to form a frame in the format received at the physical layer interface. So called HDLC-like framing is described in "PPP in HDLC-like Framing" RFC 1662 published July 1994 by the Point-to-Point Protocol Working Group of the IETF. Other kinds of framing are also used with the PPP, including framing designed to cooperate with asynchronous transfer mode ATM protocols widely used in the public switched telephone network for data communications. For example, ATM framing and FUNI framing are utilized. Upon reception, the frame is stripped of its framing fields, and a packet is passed to the datalink layer. The packet is stripped of its control fields to produce a datagram. The datagram is passed to the network layer at which network layer headers and the like are processed. Use of the PPP provides a simple technique for encapsulating data from a variety of protocols and is used for example across telephone lines between end stations and Internet access providers.

PPP sessions are established between peers. In one typical environment, the peers include equipment located at a customer site referred to as customer premises equipment CPE, and a remote access server RAS operated by an Internet Service Provider ISP. The customer dials a telephone number to access the RAS of the Internet Service Provider. The PPP is utilized to establish the peer to peer connection from the CPE to the RAS.

A tunnel is a communication channel which operates according to a tunneling protocol, including the point-to-point tunneling protocol PPTP, the layer 2 forwarding protocol L2F, the layer 2 tunneling protocol L2TP and equivalent protocols. The logical connections within a tunnel are used as a means for multiplexing the data from several users into a single tunnel.

In addition to tunneling, a variety of other techniques are utilized by the access providers to manage the flow of data through their networks.

Problems associated with these techniques arise from the increasing amount of data traffic, from the complexity of the processes required to handle the diversion of such traffic on the data networks, and from the need for efficient use of the data networks by the access providers. These problems can be addressed by increasing the processing resources located at the central offices or other intermediate devices in the access provider network. However, this solution is costly and difficult to deploy.

Accordingly, it is desirable to provide a technique supporting efficient use of access provider networks for point-to-point protocols, while minimizing the amount of process-

SUMMARY OF THE INVENTION

The present invention defines a method by which a network intermediate device that interacts with a remote network element performs the control plane interactions and interacts with the CPE to offload data plane transactions normally performed by the network intermediate device to the CPE, without the CPE needing to be aware of the complexities of the protocol involved. By distributing certain recurring protocol processing functions to the endpoints, the protocol processing at the network intermediate device is streamlined and processing bottlenecks are alleviated. This results in end-to-end performance gains.

The interaction between the network intermediate device and the CPE involves, for example, an Add_Tag command which informs the CPE to prepend future data frames with a certain sequence of bytes before sending them to the network intermediate device. The interaction also includes, for another example, a Remove_Tag command issued by the intermediate device to the CPE which tells the CPE to remove a beginning or ending sequence of bytes according to specified characteristics, from a packet before forwarding the packet to an upper layer in the CPE for processing.

For the case where the endpoint processes the frames by segmenting them into cells, for example using AAL5 encapsulation, before sending them out to the network intermediate device, it is easy to see that performance gains can be made. Without the present invention, the network intermediate device would have to reassemble the cells into frames, add appropriate tag bytes, recalculate any check sum and then resegment the frames into cells. According to the present invention, the endpoint first adds the appropriate header. Then as a result of its normal processing it performs the AAL5 operations and segments the resulting frame into cells. The network element could then quickly switch the cells without having to perform further processing.

In the receive direction, the network intermediate device quickly switches certain cells to the CPE. The CPE performs a process of extracting the packet, removing appropriate tag bytes, and sending the packet to higher layer. processing. The network intermediate device may also have hardware to help it look further into a cell than the cell header in optimal fashion if its switching relies on bytes beyond the cell header.

Thus, the present invention can be characterized as a method for improving network performance in a system that includes a network having one or more intermediate devices coupled to end stations by respective links, and through which a session is established from a first end station through an intermediate device in the network to a second end station. The network includes a first segment operating according to a first communication protocol between the first end station and the intermediate device. For example, the first segment may comprise a telephone connection having a modem such as an ADSL modem at customer premises on one end and a central office switch on the other end. The network includes a second segment that operates according to a second communication protocol between the intermediate device and the second end station. For example, the second segment comprises a virtual circuit in an ATM backbone of the access provider's network. The method comprises establishing a first channel on the first segment according to the first communication protocol for frames originating in the first end station. Also, the method includes establishing a second channel on the second segment for frames originating and destined to in the first end station, including identifying the channel parameters to be carried by data frames in the second channel. Finally, information is provided to the first end station from the intermediate device identifying one or more of the channel parameters, enabling the first end station to apply the channel parameters to outgoing frames or remove the channel parameters from incoming frames.

According to one aspect of the invention, the first and second communication protocols comprise the datalink layer protocols. For example, the first communication protocol in the preferred system includes comprises ATM cells and the first channel comprises an ATM Virtual Circuit associated with a telephone line connection such as a local loop which is running ADSL. PPP data is sent/received over the Virtual Circuit. The second communication protocol in this example comprises ATM, and the second channel comprises an ATM virtual circuit, and a tunnel across the virtual circuit.

According to another aspect of the invention, the method includes establishing a higher layer session between the first end station and the second end station. According to this aspect of the invention, the first communication protocol comprises a first type of framing of packets for the higher layer session, and the second communication protocol comprises a second type of framing of packets for the higher layer session. In a preferred system, the higher layer session comprises a Point-to-Point Protocol PPP session in which the packets are framed according to the first communication protocol in the first channel, and according to the second communication protocol in the second channel.

The present invention can also be characterized from the point-of-view of the end station, in which the method comprises receiving from the intermediate device a request to add a tag relating to the second communication protocol to packets transmitted by the first end station for the session, and in response to the request, combining the tag with packets in the session and sending the combined tag and packet to the intermediate device. Also the method includes receiving a request to remove a tag relating to the second communication protocol from packets received at the end station. In response to the request, the end station removes the tag from received frames, and forwards the packets up the local stack to higher layer processing.

According to another aspect of the present invention, a communication protocol designed for managing the communication between peers, such as the point-to-point protocol, includes a signaling channel in frames carrying packets formatted according to the communication protocol. The signaling channel is used to distribute protocol processing functions, such as edge functions for tunnel protocols, used for transport of PPP data through the access provider network, to the end stations. The signaling channel is identified in the intermediate devices and in the end stations, such as customer premises equipment or remote access servers, by a particular value or values in the protocol field of the PPP encapsulation format. The intermediate device is configured to monitor the protocol field, and when one of the particular values is recognized, to process the frame at the intermediate device. Likewise, the end station is configured to recognize particular values in the protocol field, and to process the packet received according to the signaling channel function specified by that particular value.

According to yet other aspects of the invention, the resources for management of network bandwidth comprise resources for executing tunneling protocols through the access provider network, including for example the layer 2 tunneling protocol, the layer 2 forwarding protocol, and the point-to-point tunneling protocol. This step of encapsulating the packets formatted according to point-to-point communication protocol at intermediate devices includes in one aspect of the invention the process of generating encapsulation data supporting tunneling protocol or other transport mechanisms to the access provider network, and constructing network data packets that include encapsulation data or have other formatting peculiarities. Data is transferred to the end station from the intermediate device enabling the end station to provide at least a portion of the encapsulation data in the data frames carrying packets formatted according to the point-to-point communication protocol. For example, the information sent to the end station may include actual segments of the encapsulation data, or information by which the end station is enabled to compute the encapsulation data itself.

Accordingly, the point-to-point protocol PPP or other point-to-point communication protocol is extended according to the present invention by including a signal channel by which protocol processing functions are distributed to the end points off of the intermediate devices. The efficiencies achieved by use of the signaling channel can reduce congestion in network equipment arising because of the extra protocol processing load on the intermediate devices.

Other aspects and advantages of the present invention can be seen upon review of the figures, the detailed description, and the claims which follow.

DETAILED DESCRIPTION

Figure 1:
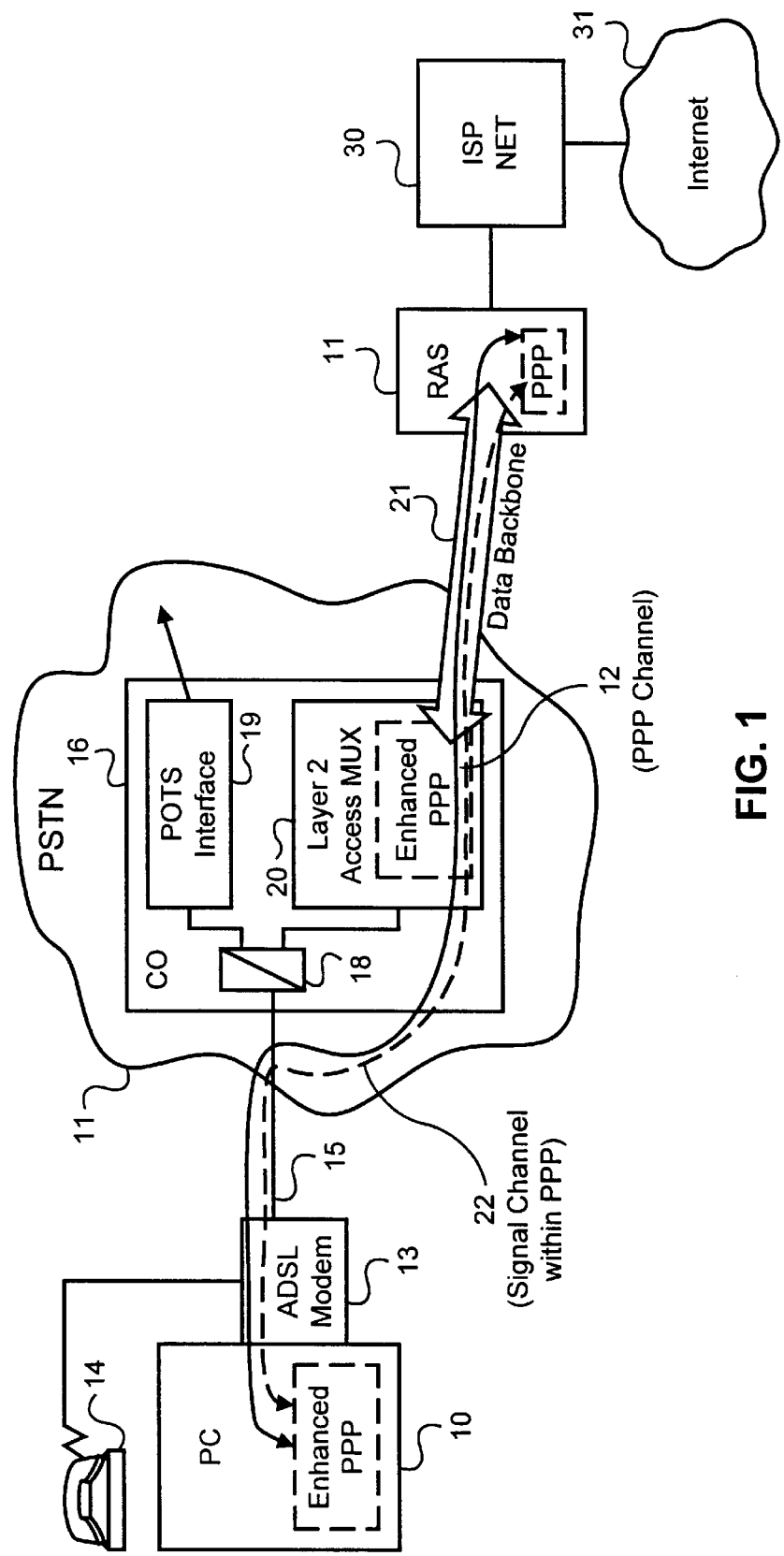
FIG. 1 is a simplified diagram of an example network environment in which enhanced point-to-point protocol of the present invention is implemented.

A detailed description of examples of the present invention is provided with reference to the figures, in which FIG. 1 illustrates a context in which the present invention is used.

FIG. 1 illustrates a point-to-point connection between peer end stations, in this example a personal computer 10 and a remote access server 11. The point-to-point communication session in this example is represented by the arrow 12 established according to the point-to-point protocol PPP. The personal computer 10 includes a modem 13, which in a preferred embodiment is a high throughput modem such as an asynchronous digital subscriber loop ADSL modem. The modern 13 is connected to a telephone line which can be shared with a standard telephone equipment 14. The modem 13 is connected by a local loop medium such as link 15 to equipment in a central office 16 in the public switched telephone network PSTN represented by the cloud 17. The central office 16 includes a splitter 18 by which data traffic is split, physically or logically, from voice traffic. The voice traffic is supplied to an interface for voice traffic through the network 17 such as a POTS (plain old telephone service) interface 19. Data traffic is routed from splitter 18 to an access multiplexer 20 for connection to a data network managed by the telephone access provider. Alternatively, the function of the splitter can be integrated into the line card of the access multiplexer. Under this scenario, the voice traffic is separated from the data traffic by the access multiplexer. Several voice streams may be multiplexed together by the access unit and sent via one or more interfaces to the PSTN. Similarly, data traffic would be sent over interfaces connected to the carriers broadband backbone network. Typically the access multiplexer 20 operates at layer 2 of the network protocol stack, or otherwise operates as a network intermediate device. The access multiplexer 20 provides an edge device for a data backbone network 21 which is coupled to the remote access server 11. The point-to-point session 12 is established from the personal computer 10 through the splitter 18 and access multiplexer 20, across the data backbone 21, such as an ATM virtual circuit, to the remote access server 11. The remote access server 11 in this example is coupled to an Internet service provider network 30, which includes for example a server "farm". The Internet service provider network is in turn coupled to the Internet 31.

The personal computer includes an enhanced point-to-point protocol module according to the present invention. Also the access multiplexer 20 includes an enhanced point-to-point protocol processing module to handle the signaling channel according to the present invention. The remote access server 11 includes a point-to-point protocol module (preferably but not necessarily enhanced according to the present invention) and operates as the end point, or peer, for the point-to-point session 12. According to the present invention, a signaling channel within the point-to-point protocol session is included, represented by the dashed line 22. The access multiplexer will continuously monitor for Point-to-Point frames (prior to establishment of the Point-to-Point session, during establishment of the Point-to-Point session, and upon establishment of the Point-to-Point session). For example, for the PPP-ATM-ADSL case, this monitoring could start once the connect message was sent from the access mix to the CPE. Point-to-point protocol frames carrying a code indicating that they are signaling channel frames are then processed in the enhanced PPP module in the access multiplexer 20.

The signaling channel is identified by a particular value or values in the protocol field of the standard PPP encapsulation, in a preferred example. Alternatively or in combination, other fields, such as the address field of the HDLC-like framing standard for PPP packets are used to identify signaling channel frames. The signaling channel is used to achieve a number of functions referred to as edge functions, that are relevant to assisting the access multiplexer 20 in the management of network traffic. For example, the signaling protocol can be used to distribute protocol processing functions which are required for transferring the PPP frames across the data backbone 21 to the end points, without requiring the end points to be aware of the intricacies of the protocol on the data backbone 21.

FIG. 1 represents a typical setup for access by a consumer using equipment at the consumers premises to the Internet 31 via an Internet service provider. It can be appreciated when a large number of end stations, such as the personal computer 10, access the single remote access server 11 through an access multiplexer 20, the access multiplexer must have significant processing resources to manage the edge functions.

The environment of FIG. 1 is a simplified depiction. In some environments, the remote access server 11 is also coupled to the PSTN 17 through a central office switch. Also, the access multiplexing functions executed by the access multiplexer 20 and the data backbone 21 are implemented in some networks between intermediate devices other than central office switches to concentrate traffic over high bandwidth links within the PSTN, which may not be directly coupled to a central office switch. For example, the intermediate device at which the signaling channel is processed may be a router or an ATM switch located in the access provider network. Data from several access multiplexers may be aggregated in the intermediate device which processes the signaling channel.

Figure 2:
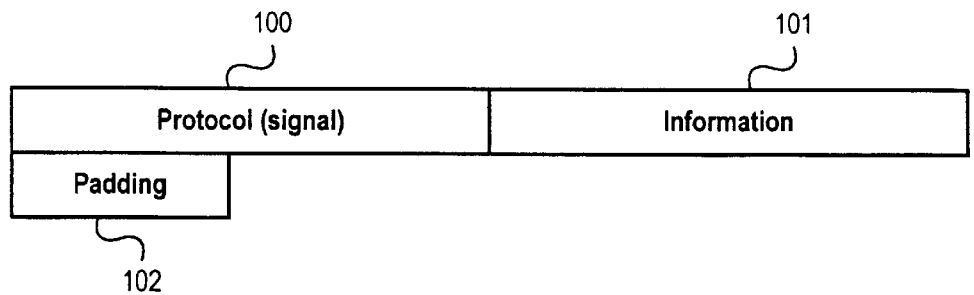
FIG. 2 is a diagram of a packet formatted according to the point-to-point protocol enhanced according to the present invention.

In a PPP session, packets are formatted according to specifications defining the fields shown in FIG. 2. The Protocol field 100 is one or two octets, and its value identifies the datagram encapsulated in the Information field 101 of the packet. For example, if the Protocol field has a value indicating IP, the Information field will contain an IP packet. The Protocol can have other defined values. For example, there is a value indicating a Link Control Protocol (LCP) frame. Such a packet is used by the end points of the PPP session, to agree upon encapsulation format options, handle varying limits on sizes of packets, etc.

The Information field 101 is zero or more octets. The Information field 101 contains the datagram for the protocol specified in the Protocol field 100. The maximum length for the Information field 101, including Padding 102, but not including the Protocol field 100, is termed the Maximum Receive Unit (MRU), which defaults to 1500 octets. By negotiation, consenting PPP implementations may use other values for the MRU.

Figure 3:
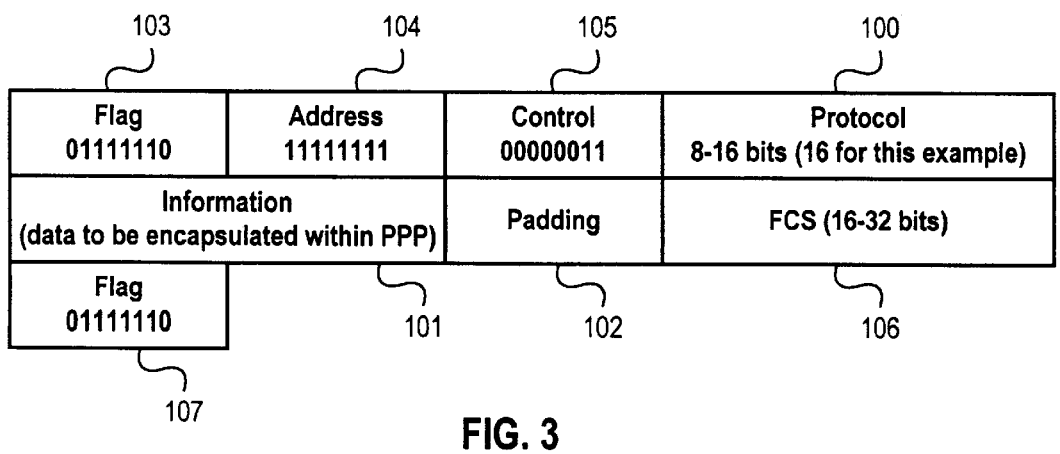
FIG. 3 is a diagram of a frame formatting accorded to the HDLC-like framing over the point-to-point protocol.

When sending the PPP packet as shown in FIG. 2 over an ADSL link, which is a bit-synchronous link, the PPP packet is encapsulated within an HDLC frame as shown in FIG. 3 for the PPP-ADSL stack. The Protocol, Information, and Padding fields shown in FIG. 3 are the PPP fields that were described in FIG. 2. Alternatively, the PPP packet will be adapted using AAL5 adaptation and then segmented into ATM cells over the ADSL line (if the PPP-ATM-ADSL stack is being used). A third alternative, which is the PPP-FUNO-ADSL stack, also uses encapsulation based on HDLC but with different allowed values for certain fields then for PPP-ADSL.

FIG. 3 shows the encapsulation of PPP within HDLC-like framing. The HDLC-like frames carrying PPP packets is used for datalink layer (layer 2) communication protocol between the CPE and the access multiplexer in the system of FIG. 1. An HDLC frame is started by a flag sequence 103 of '01111110' binary. It is followed by an Address field 104; the only defined value according to the standard that the Address field can have is '11111111' binary. Following the Address field 104 is a Control field 105 with a value of '00000011' binary. Following the Control 105 field is are the PPP Protocol field 100, the PPP Information field 101, and the PPP Padding 102. This is followed by a Frame Check Sequence 106 for the HDLC frame which can be 16 bits or 32 bits. Finally, the HDLC frame is terminated by a closing Flag sequence 107 of '01111110' binary.

Frames carrying packets belonging to the signaling channel will be identified via a special value, presently not assigned for other uses, of the Protocol field within the PPP encapsulation shown in FIG. 2. For example, a Protocol Field of 16 bits with a value of '1001000000000001' binary could be used to identify a PPP frame associated with the signaling channel.

Figure 4:
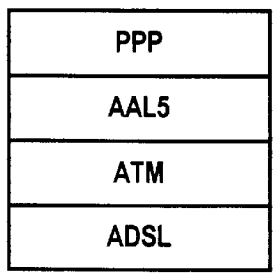
FIG. 4 is an illustration of a protocol stack providing for ATM over AAL5 framing of a point-to-point protocol on an ADSL link.

According to the present invention, the access multiplexer 20 includes resources for identifying PPP frames such as those illustrated in FIGS. 2–4 which carry a signaling protocol value in the protocol field. Such resources include, hardware comparators which compare data at a specific offset within each frame to one or more hard coded values, software resources which perform the comparison function, and combinations of hardware and software. Hardware comparators are preferred in systems requiring fast decisions, or in systems having low processing resources. Software comparison techniques provide greater flexibility and other advantages. In addition to resources for recognizing frames which are part of the signaling channel, the access multiplexer 20 includes an enhanced PPP module that performs the functions specified by this signaling channel frames.

One of the protocol stacks that has been approved for ADSL consists of sending PPP packets using ATM's AAL5 encapsulation of ATM cells running over an ADSL link. FIG. 4 shows the relevant protocol stack.

Figure 5:
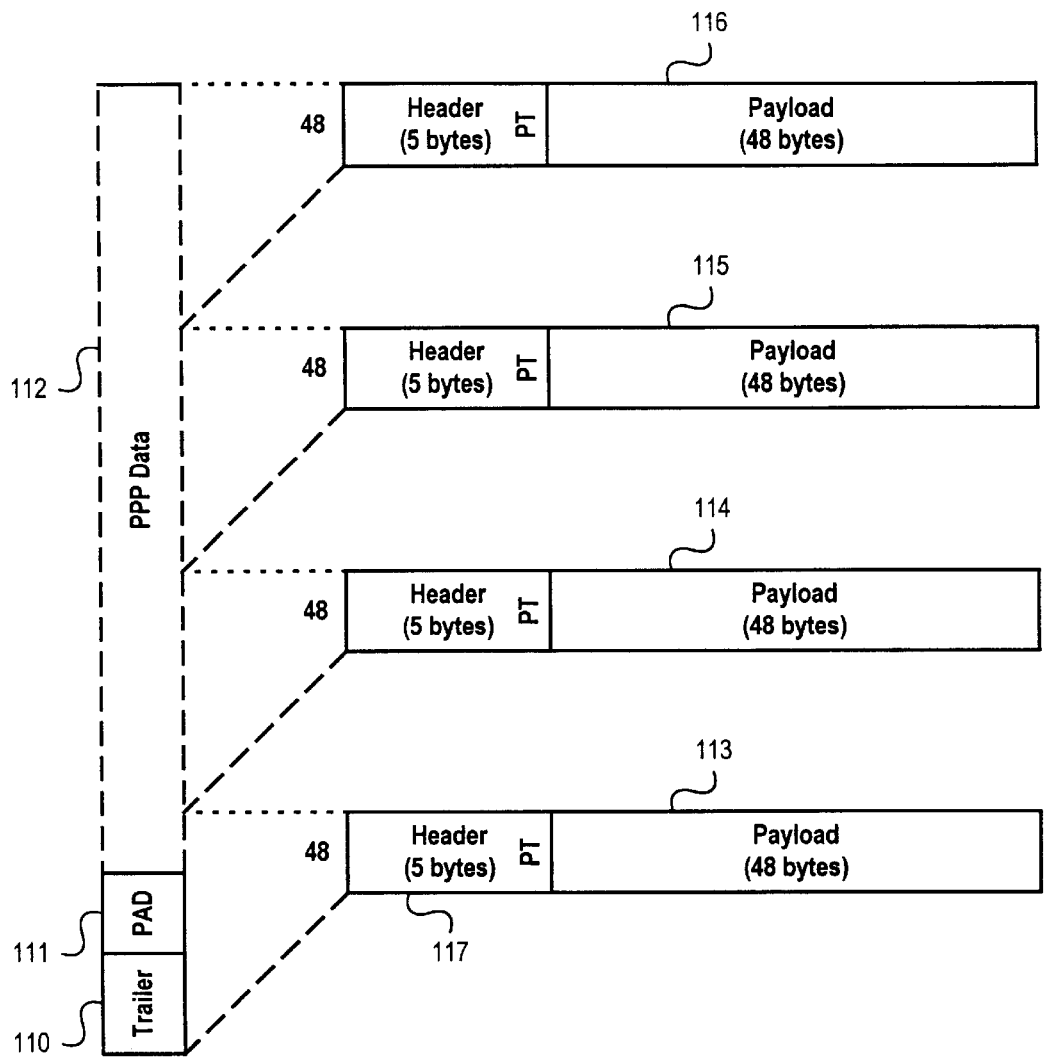
FIG. 5 illustrates the segmenting of a PPP packet into cells using AAL5 encapsulation.

Before segmentation into ATM cells, the PPP data has the format shown in FIG. 2. FIG. 5 depicts the way the segmentation occurs using AAL5 framing. AAL5 framing consists of adding a trailer 110 to the PPP packet 112. This trailer 110 includes the following fields:

A CPCS UU filed of 1 byte.

A CPI field of 1 byte.

A Length field of 2 bytes.

A CRC of 4 bytes.

The trailer is 8 bytes. Before the trailer 110, PAD bytes 111 are used so that the length of the total frame that is to be converted into cells is a multiple of 48 bytes. The frame is then segmented into cells 116, 115, 114, 113 and so on.

The 5 byte Header (e.g. 117) of each cell contains the Virtual Circuit (VC) information associated with the VC on which the data is being sent. Also included in the header is a PT field which has a specific bit dedicated to AAL5 encapsulation. This bit of the PT field is used in the AAL5 encapsulation to indicate whether or not a cell is the last cell associated with a segmented frame. It is set to '0' in all cells associated with the frame except the last cell, where it is set to '1'.

The ATM Virtual Circuit is terminated at the Access Multiplexer. The Access Multiplexer may take the data from several different CPE and send it on a single, aggregated VC to the ISP Remote Access Server (RAS). This is done to prevent Virtual Circuit explosion in the core of the carrier network (between the access multiplexer and the ISP RAS).

When taking the data from several CPE and multiplexing it onto one VC to the ISP RAS, or taking data associated with several different VCs from a single CPE where each VC carries data from a single PPP session and multiplexing it onto one VC to the ISP RAS, or any combination of the preceding two possibilities, it is necessary to use some multiplexing scheme over the single VC to the RAS so as to be able to identify and separate the data belonging to different PPP sessions. An example of such a multiplexing scheme is the Layer 2 Tunneling Protocol (L2TP)

Figure 6:
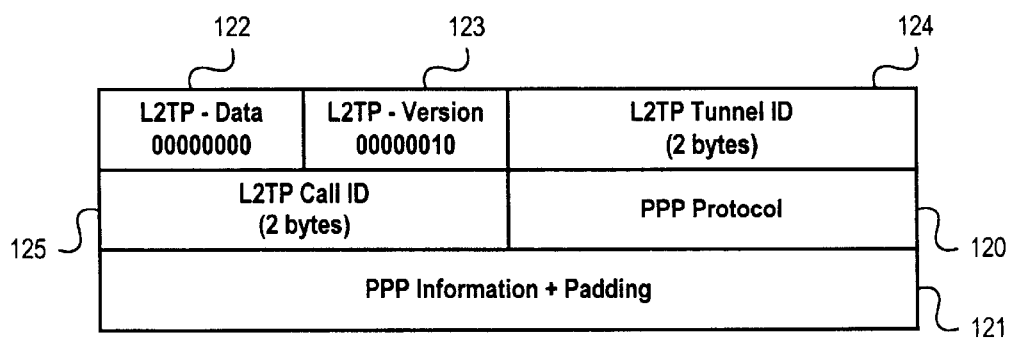
FIG. 6 illustrates encapsulation according to the layer 2 tunneling protocol.

FIG. 6 shows the minimal encapsulation for PPP data packets sent between two L2TP endpoints. For our example, the two endpoints will be the access multiplexer and the ISP RAS. The access multiplexer will multiplex multiple PPP sessions onto a single virtual circuit by using L2TP. The minimal L2TP encapsulation consists of prefixing the PPP packet 120, 121 with a 6-byte L2TP header. The first byte 122 in this encapsulation is set to all zeroes, which indicates an L2TP payload packet using no length field, no send sequence number, and no receive sequence number. The second byte 123 is set to a value of binary '00000010', which is the present L2TP version. The next two bytes 124 are used to define an L2TP Tunnel. An L2TP Tunnel exists between 2 endpoints. Multiple logical connections may be associated with a particular tunnel. Each logical session is defined via the L2TP Call ID 125. PPP data belonging to a particular session from a particular CPE is mapped one-to-one to a particular L2TP Tunnel and logical connection via the L2TP Tunnel ID and L2TP Call ID bytes. Thus, the L2TP tunnel over an ATM virtual circuit provides a datalink layer (layer two) communication protocol for at least a segment of the network in the system of FIG. 1.

Note that there are two parallel components of L2TP operating over a given L2TP tunnel—control messages between the two tunnel endpoints, and payload packets sent between the endpoints. The payload packets are used to transport L2TP encapsulated PPP packets for user sessions between the tunnel endpoints. The structure of such payload packets is what is shown in FIG. 6 and what was described earlier.

The actual assignment of Call IDs within a tunnel is accomplished via the exchange of control messages between tunnel endpoints. A control message is indicated by having a value of '1' in the highest order bit of the first byte 112 of an L2TP packet (as opposed to a value of zero, which signifies a payload packet). Independent Call ID values are established for each end of a user session. The sender of a packet associated with a particular session places the Call ID established by its peer in the Call ID header field 125 of all outgoing packets.

Figure 7:
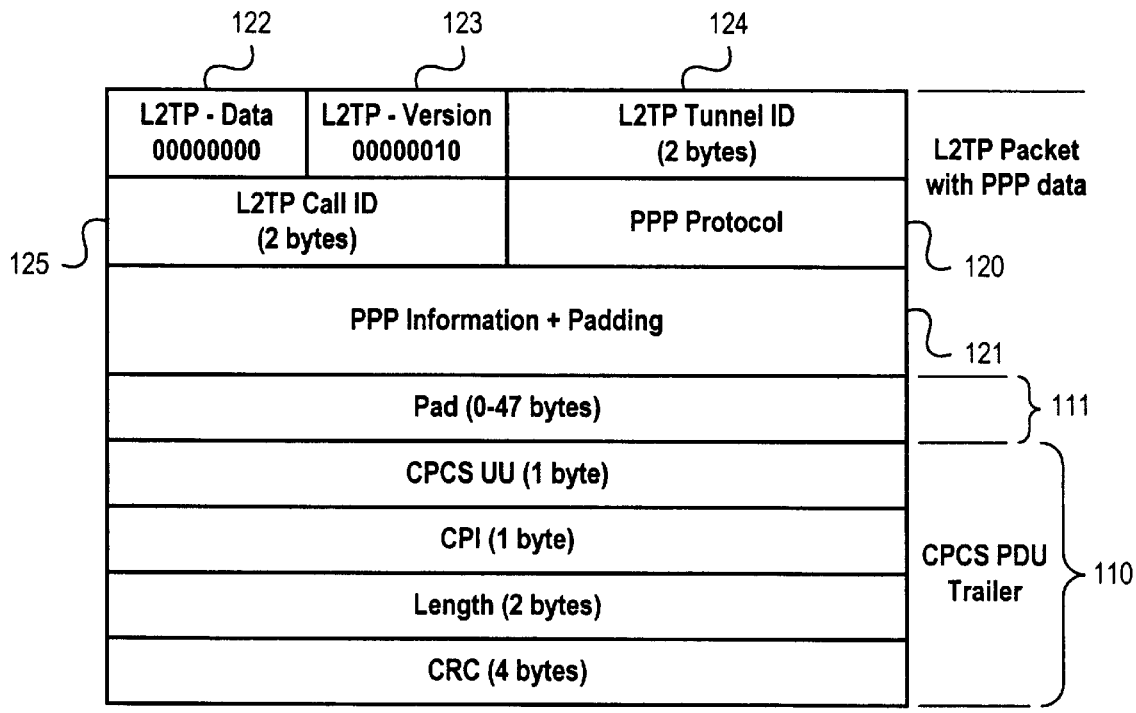
FIG. 7 illustrates the AAL5 adaptation of a layer 2 tunneling protocol L2TP frame.

FIG. 7 shows how the L2TP packet containing the PPP data is encapsulated using AAL5 encapsulation before being segmented into ATM cells using the reference numbers of FIGS. 5 and 6.

Figure 8:
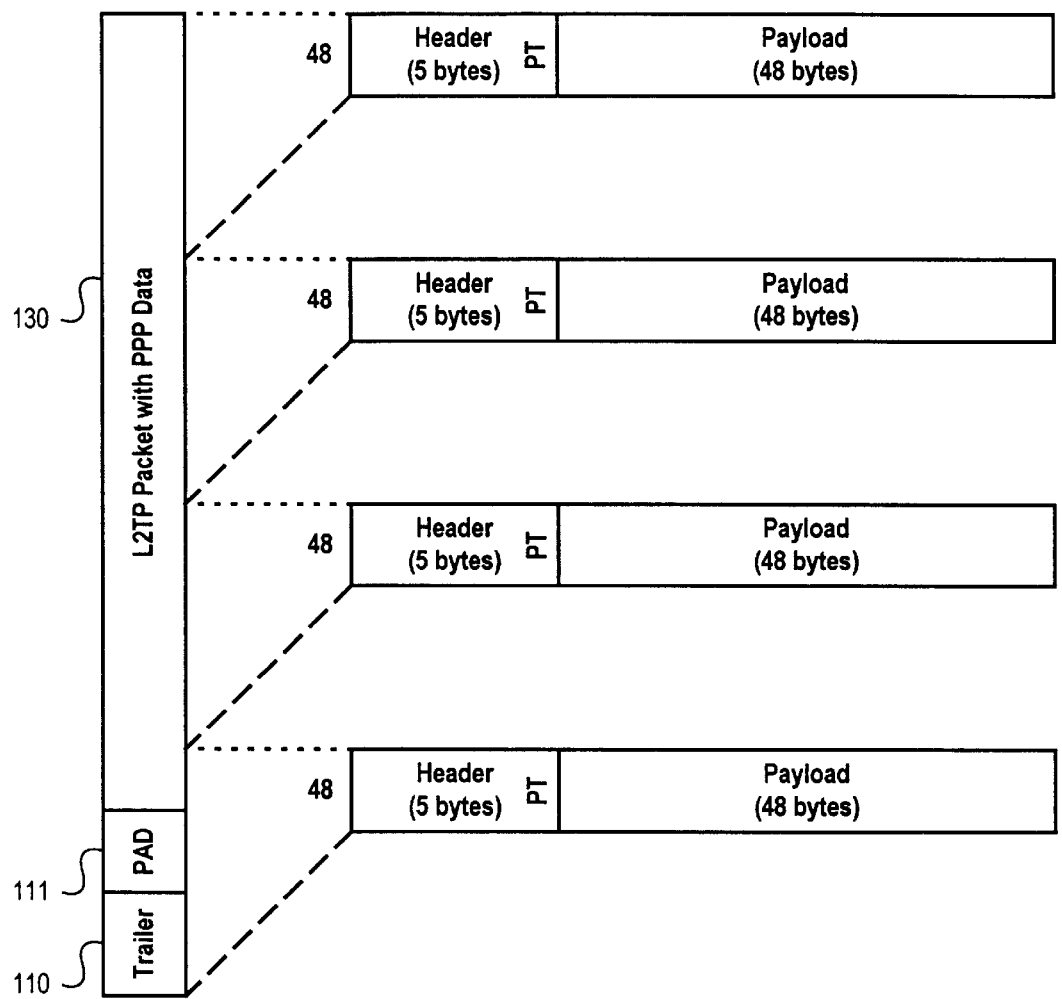
FIG. 8 illustrates the process of sending AAL5 adapted data on a virtual circuit between an access multiplexer and an ISP RAS.

The resulting AAL5 frame is then segmented as shown in FIG. 8. Note the similarity of FIG. 8 to FIG. 5. In FIG. 5, PPP data from ADSL endpoints was adapted using AAL5 for transmission across a particular VC. In FIG. 8, PPP data from several ADSL endpoints is sent from the access multiplexer to the ISP RAS. This is why the extra L2TP encapsulation (packet 130) is needed—this encapsulation allows for multiplexing the data from the different PPP sessions, where each session will be identified by a unique Tunnel ID and Call ID.

Figure 9:
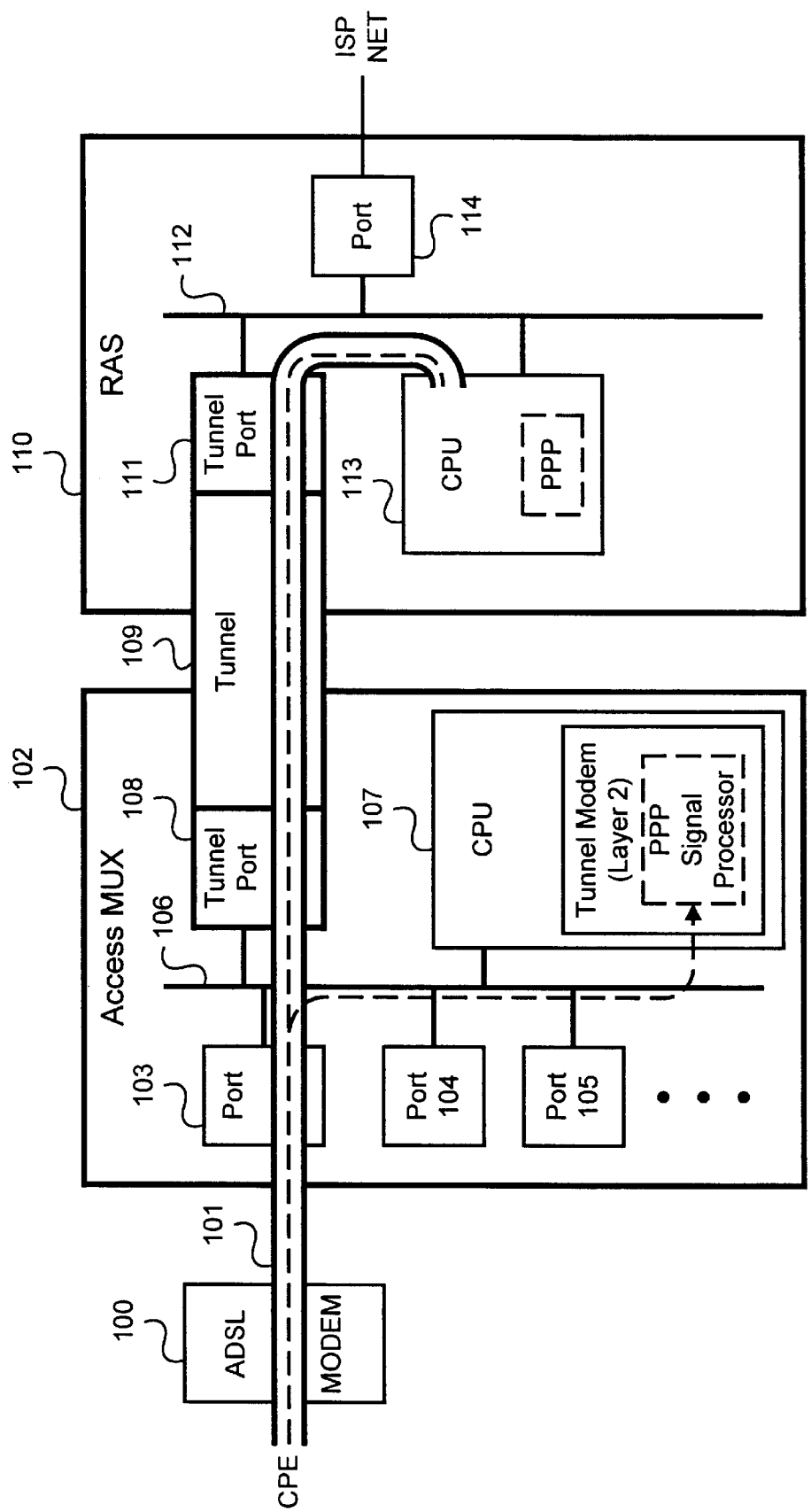
FIG. 9 is a more detailed diagram of a point-to-point communication channel including a signaling channel according to the present invention, where the point-to-point communication channel is established between a customer premises equipment CPE and a remote access server RAS.

FIG. 9 is representative of one example implementation of an access multiplexer and a remote access server according to the present invention. In FIG. 9, an ADSL modem is coupled to customer premises equipment CPE as an end point of a point-to-point session 101. The point-to-point session 101 is established through an access multiplexer 102. The access multiplexer 102 includes a port 103 for communication with the modem 100. Also, a plurality of other ports may be included in the access multiplexer 102 such as ports 104 and 105. The ports 103–105 are coupled to a bus 106. A central processing unit 107 is coupled to the bus 106. The central processing unit 107 includes tunnel management resources for layer 2 tunneling and a point-to-point protocol signal channel processor. Also coupled to the bus 106 is a port 108 for connection across a backbone communication channel, such as a layer 2 tunnel protocol L2TP tunnel 109. The CPU 107 monitors frames received on port 103 and performs edge functions for transferring the frames through the tunnel 109 to the destination, such as a remote access server 110. The remote access server includes a tunnel port 111, which is coupled to a backbone bus 112. The backbone bus is coupled to a central processing unit 113 in the remote access server which includes a point-to-point protocol module. Also, the remote access server 110 includes a port 114 for connection to a local network, such as an Internet service provider network.

The ports 103–105 include filters for recognizing signaling channel frames, and signaling the CPU 107 that PPP signaling processing is required. Alternatively, frames received on ports 103–105 are monitored by software executed by the CPU 107 for edge processing and for PPP signal channel processing.

Figure 10:
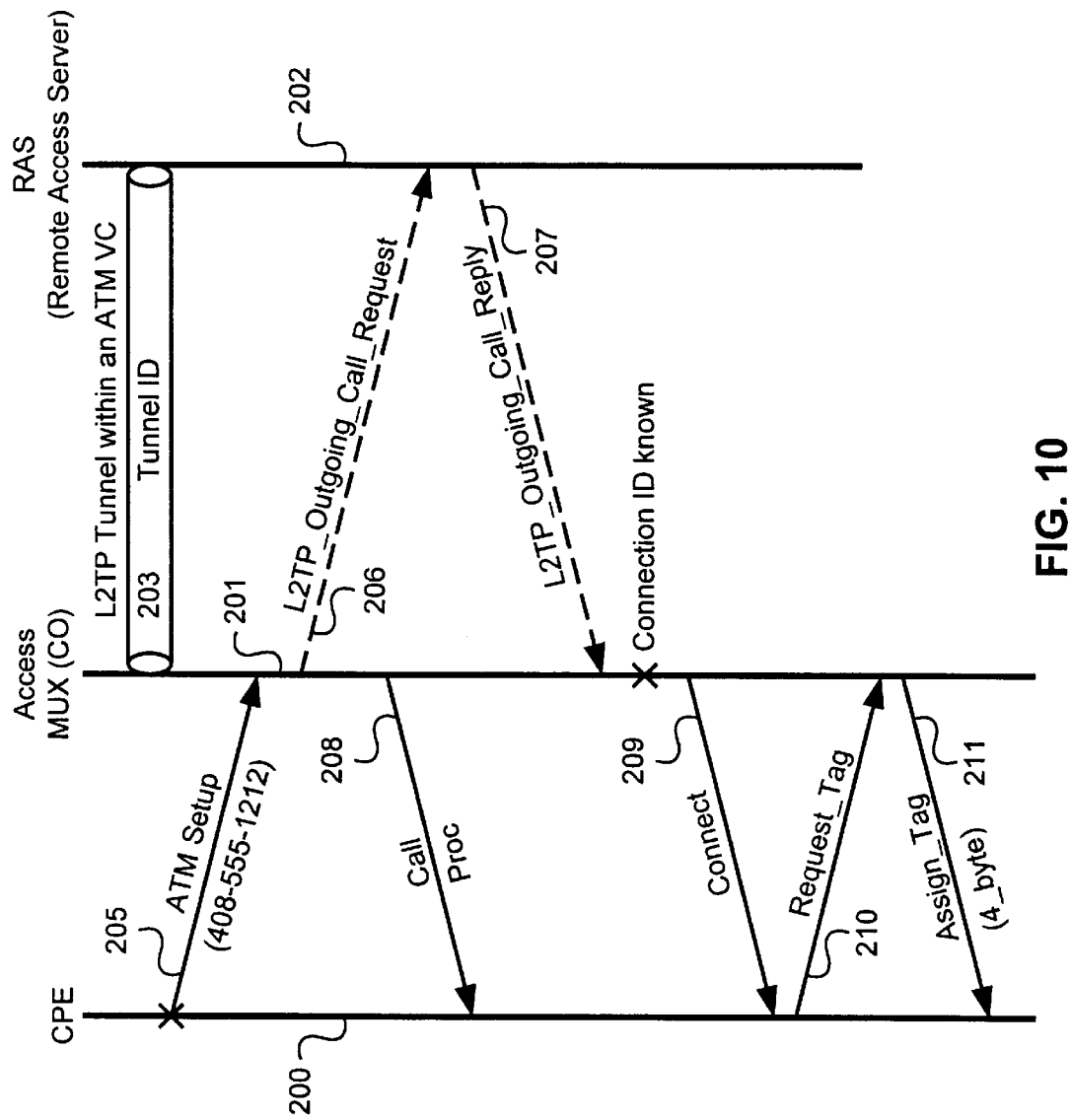
FIG. 10 illustrates the signals generated according to the enhanced point-to-point protocol of the present invention for one example process for offloading protocol processing using the signaling channel.

FIG. 10 illustrates signaling exchange according to one example implementation of a point-to-point communication channel according to the present invention. In FIG. 10, the customer premises equipment is represented by the vertical bar 200. The access multiplexer at the central office, or elsewhere in the telephone access provider network, is represented by the vertical bar 201. The remote access server, or other peer end point of the point-to-point channel is represented by the vertical bar 202. In this example, the access multiplexer 201 and the remote access server 202 set up a layer 2 tunneling protocol L2TP tunnel 203. This provides high bandwidth communication for a plurality of point-to-point channels between the access multiplexer 201 and the remote access server 202. In this example, the tunnel 203 is implemented across an ATM virtual circuit within the telephone access provider network.

The customer premises equipment initiates a point-to-point protocol channel by issuing an ATM setup signal 205. The access multiplexer 201 transfers a layer 2 tunneling protocol outgoing call request message 206 to the remote access server 202. The remote access server responds with an outgoing call reply message according to the layer 2 tunneling protocol 207. Meantime, the access multiplexer 201 may issue call proceeding messages 208 to the CPE 200. Upon receiving an outgoing call reply signal 207, the access multiplexer has established a connection identifier—the Tunnel ID and the Call ID fields. The connection identifier being known, a connect signal 209 is issued to the customer premises equipment establishing a channel for a point-to-point connection, by which a communication with the remote access server 201 is provided. According to the present invention the CPE issues a frame according to the PPP protocol with a signal for the access multiplexer. In this example, the frame is a signaling protocol frame having a field in the protocol field of the PPP encapsulation identifying "a request for tag" message 210. The access multiplexer 201 recognizes the signaling channel frame, and responds with an "assign tag" message 211 using the signaling channel of the point-to-point protocol. In this embodiment, the tag comprises the tunnel ID and call ID fields according to the layer 2 tunneling protocol. The CPE 200 is thus enabled to assist the access multiplexer in providing encapsulation for the tunnel 203. For example, the tunnel ID and call ID tags are appended to the PPP frame in the appropriate locations, such as the head of the protocol field of the PPP encapsulation. The function of adding the tag to the packet is thus removed from the access multiplexer 201, and the function transferred to the customer premises equipment.

Depending on the characteristics of the tunnel 203 or other backbone network protocol utilized by the access multiplexer, the CPE 200 can use its abundant processing resources to assist in the edge functions. For example, the protocol and information fields in the PPP frame can be setup with sizes that reduce the amount of fragmentation required at the access mulitplexer. In addition, protocol information can be inserted within the PPP information field at appropriate locations to assist in network operation. Another example of an edge function that could be performed by the CPE includes performing flow control (using send and receive sequence numbers) in the L2TP header. This would require more than the 6-byte minimum needed to hold the tunnel ID and the call ID tags. Appropriate commands would have to be defined for the signaling channel. As more PCs get equipped with L2TP functionality, a command such as Run_L2TP_Data_Plane which supported the appropriate tunnel IDs and call IDs for each direction could be used. Thus, the PPP extension provided by this invention allows the access provider to distribute some of the multiplexing processing to individual CPE. The access provider equipment understands the control plane of the multiplexing/tunneling protocol used by the backbone network, and negotiates with the Internet service provider equipment, or with other intermediate network devices, according to these protocols. As a result of these control plane interactions, data plane encapsulations are determined. The access equipment then uses the signaling channel of the PPP enhancement of the present invention to inform the CPE to encapsulate the PPP data in a certain way. In this scheme, the CPE helps with data plane multiplexing activities without having to be aware of the details in control plane of the protocol.

This example of the invention presents a method to make the operation of the access multiplexer simpler and more efficient when performing this multiplexing task towards the ISP RAS and demultiplexing task towards the CPE. First, let's consider how the access multiplexer would have to work today (without the capabilities described in this invention):

In the direction from the Access Multiplexer towards the ISP RAS:
1. Assume that the access multiplexer has an L2TP tunnel existing between itself and the ISP RAS (running over some ATM VC).
2. On receipt of a new ATM VC from an ADSL endpoint at the datalink layer, the access multiplexer would negotiate with the ISP RAS for a new Call ID within an existing tunnel (or it would establish a new VC and tunnel, and then negotiate for a new Call ID).
3. As the cells from the ADSL CPE arrive at the access multiplexer, it will use the PTI bit to aggregate cells into PPP packet. It will then prefix a complete PPP packet with the appropriate L2TP header. It will then use AAL5 adaptation and then segment the AAL5 adapted L2TP packets into cells.

In the direction from the ISP RAS to the CPE:
1. The access multiplexer will receive cells from the ISP RAS. Using the PTI bit, it will assemble these cells into the AAL5 frame, and extract the L2TP frame.
2. Using stored information, the access multiplexer will map the L2TP Tunnel ID and Call ID to a VC to a particular ADSL CPE.
3. The access multiplexer will extract the PPP data from the L2TP frame, and using AAL5 adaptation, send the data to the ADSL CPE.

Note that in the scheme described above, the multiplexing activities of the access multiplexer were transparent to the ADSL CPE. However, there are several drawbacks to the scheme described above:

1. The access multiplexer needs to reassemble cells into frames, add the L2TP header, and then resegment the frames into cells towards the ISP RAS. Repeating this operation over thousands of subscriber sessions puts a computation strain on the resources of the access multiplexer. There is a coincident cost associated with needing to do such operations.
2. In the direction from the ISP RAS towards the ADSL CPE, the access multiplexer again needs to reassemble cells into frames. It needs to extract the PPP data, determine the ADSL endpoint, perform AAL5 adaptation, and segment frames into cells. There is a coincident cost associated with needing to do such operations.

This invention describes a means of distributing some of the protocol processing to ADSL endpoints. This distribution occurs without the ADSL endpoints needing to be aware of the intricacies of the multiplexing scheme being used (L2TP in the examples used here). Using the procedure described in this invention, segmentation of frames into cells occurs only once for traffic that is sent from the CPE to the ISP RAS via the access multiplexer or for traffic from the ISP RAS to the CPE via the access multiplexer. This occurs while using the same multiplexing means as described earlier in this document.

The procedure makes use of the PPP Signaling Channel between the ADSL endpoints and the access multiplexer. The access multiplexer would then work as follows on receipt of a new VC being setup from an ADSL endpoint (using the PPP-ATM-ADSL stack) for data from that endpoint towards the RAS:

1. On receipt of a new ATM VC from an ADSL endpoint, the access multiplexer negotiates with the ISP RAS for a new Call ID within an L2TP Tunnel. As a result of this negotiation involving the L2TP control plane, the access multiplexer now has complete information on the L2TP tag that has to be prepended to PPP data from a particular CPE session being sent to the ISP RAS. It is assumed here that no send sequence number (N(S)) or receive sequence number (N(R)) is used in the L2TP tunnel. This leads to a minimum L2TP header of 6 bytes.
2. Via the signaling channel, the access multiplexer informs the CPE to prefix a 6 byte sequence to all PPP frames.

This 6 byte sequence corresponds to the minimal L2TP encapsulation described earlier. It uses a command with the functionality of the Add_Tag command to inform the CPE of the 6 bytes to prepend to the PPP data The CPE has no idea of the meaning of these 6 bytes. They could correspond to any multiplexing scheme used by the access multiplexer. In our example, the multiplexing scheme used for illustrative purposes is L2TP. A positive acknowledgment would allow the access multiplexer to know that the Add_Tag command was successful at the CPE. It would mean that the CPE was prepending the bytes specified in the Add_Tag command to any PPP data frames that it was sending out, before using AAL5 adaptation on these frames and segmenting the frames into cells.

3. Now, any cells associated with the new VC from the CPE can be forwarded on the VC to the ISP RAS without reassembly/processing/resegmentation. This makes the job of the access multiplexer much easier. Note that all the cells from a particular frame have to be sent consecutively towards the RAS before cells from some other frame are sent on the same VC to the RAS.

4. Note that signaling channel frames are not prepended by the tag. Only data frames destined for the ISP RAS are prepended with the tag. This means that the access multiplexer can quickly look into the first cell of a new frame from the CPE to see if it contains a signaling channel frame or not. If it does, this frame would be reassembled for processing by the access multiplexer. Otherwise, processing would proceed as described in the preceding items. Note that special hardware can be designed that makes this operation of looking into the first cell of a new frame to determine whether it is a signaling frame very efficient. When the CPE receives cells from the access multiplexer, it reassembles these cells into frames. It will look to see if the frame is a PPP signaling frame. If it is, the CPE will process it. Otherwise, it performs the processing described below.

Processing of data from the ISP RAS towards the ADSL endpoint would work as follows:

1. The access multiplexer would send a Remove_Tag command to inform the CPE that it should remove a certain number of bytes from the beginning of each frame it extracts from the AAL5 adaptation process. This is necessary since the access multiplexer will not be removing the L2TP multiplexing header prepended to PPP frames by the RAS.

2. The ISP RAS would look into the first cell of a new frame. (Note—the first cell of a new frame can be identified by looking at the PT bit. A cell with a PT bit of one or zero following a cell with a PT bit of 1 signifies the first cell of a new frame. The very first cell received from the ISP RAS is the first cell of a new frame.) It would then look at the first 6 bytes after the header in the aforementioned cell. If the very first bit of the first byte was a '1', this would mean that the frame being received was an L2TP control frame that needs to be terminated and processed by the access multiplexer. If the very first bit of the first byte was a '0', it would mean that an L2TP data payload frame was being transferred by the RAS. The access multiplexer would then check the L2TP Tunnel ID and Call ID associated with the frame (this is still part of the first 6 bytes of the first cell), and look into its tables to determine the CPE that the data is destined for. It would then forward the initial cell and the remaining cells associated with the frame to the appropriate CPE; the PT bit would be used to determine which cells correspond to the same frame. As mentioned earlier, special hardware can be designed that makes this operation of looking into the first cell of a new frame very efficient.

This invention allows efficient and fast operation of the equipment in carrier networks that is used to multiplex the data from several ADSL subscribers towards an ISP RAS. It makes use of the PPP signaling channel for coordination between the CPE and the access multiplexer; this channel was described in a previous invention. For the example provided here, the ADSL CPE use the PPP-ATM-ADSL stack; the access multiplexer takes data from individual ATM Virtual Circuits from ADSL subscribers and multiplexes the data onto a single Virtual Circuit towards the ISP RAS. The access multiplexer negotiates with the ISP RAS for the necessary L2TP Call ID. With this information, it knows the complete 6 byte header that the RAS expects to see for data associated with this particular session. It then informs the CPE to prepend these 6 bytes to any PPP payload frames. The fact that this prepending happens at the CPE means that the access multiplexer does not need to reassemble cells into frames, add the header, and segment frames into cells. Note that the prepending of the bytes happens at the CPE without the CPE needing to be aware of the complexities of the multiplexing protocol. In the direction from the ISP RAS towards the CPE, the access multiplexer looks at the first 6 bytes of the first cell of a new frame. If the frame is an L2TP data frame, it looks to find the CPE associated with that L2TP session, and relays the data on the appropriate Virtual Circuit to that CPE. Cells do not have to be reassembled into frames in order to remove the multiplexing header at the access multiplexer. Instead, the access multiplexer informs the CPE to remove the first 6 bytes of reassembled frames. Note that the CPE will only remove the first 6 bytes of such frames if it determines that the frame is not a PPP signaling frame (this can be determined easily by looking for the particular value in the first two bytes that corresponds to a Protocol field signifying the PPP signaling channel).

Similar distribution of processing can be made to apply to cases that are end-to-end frame based as well as the cell based techniques discussed above. Some cases can potentially be made even more efficient with the use of the second command for the send direction from the CPE such as a command to encapsulate data into a user datagram protocol UDP datagram. In this encapsulation, the source and destination ports are specified, as well as whether a checksum should be calculated. The command is executed after the data is tagged with appropriate sequence of bytes as a result of an Add_Tag command. In the receive direction, a sequence of commands such as extract data from the UDP datagram, and remove the tag is executed to allow for extraction of appropriate data before sending it to the higher layer for processing.

Accordingly, the present invention provides an extension to the point-to-point protocol that allows for interactions between end points of the point-to-point session and intermediate network devices involved in the transfer of data between the end points. The channel is used to relieve congestion in the intermediate devices that arise due to edge functions like protocol processing.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a system including a network having one or more intermediate devices coupled to end stations by respective links, and through which a session is established from a first end station through an intermediate device in the network to a second end station, the network including a first segment operating according to a first communication protocol between the first end station and the intermediate device, and a second segment operating according to a second communication protocol between the intermediate device and the second end station, a method for improving network performance, comprising:

establishing a first channel on the first segment between the first end station and the intermediate device according to the first communication protocol for data frames originating in the first end station;

establishing a second channel on the second segment between the intermediate device and the second end station according to the second communication protocol for data frames originating in the first end station, including identifying channel parameters to be carried by data frames in the second channel;

providing information identifying one or more of the channel parameters for the second channel from the intermediate device to the first end station, enabling the first end station to at least one of apply one or more of the channel parameters to data frames in the first channel and remove one or more of the channel parameters from data frames in the first channel, to reduce processing in the intermediate device.

2. The method of claim 1, wherein the first communication protocol comprises ATM cells, and the first channel comprises an ATM Virtual Circuit over an ADSL line.

3. The method of claim 1, wherein the second communication protocol comprises ATM, and the second channel comprises an ATM virtual circuit.

4. The method of claim 3, wherein the second communication protocol comprises a tunneling protocol over the ATM virtual circuit.

5. The method of claim 1, wherein the first communication protocol comprises a datalink layer protocol.

6. The method of claim 1, wherein the first communication protocol comprises a datalink layer protocol; and the second communication protocol comprises a datalink layer protocol.

7. The method of claim 1, wherein the first communication protocol comprises PPP over ATM cells, and the second communication protocol comprises a Layer 2 Tunneling Protocol L2TP over ATM.

8. The method of claim 1, including establishing a higher layer session between the first end station and the second end station, and the first communication protocol comprises a first type of framing of packets for the higher layer session, and the second communication protocol comprises a second type of framing of packets for the higher layer protocol.

9. The method of claim 8, wherein the first type of framing comprises ATM cells, and the second type of framing comprises ATM cells with L2TP multiplexing used in the frames that the cells convey.

10. The method of claim 8, wherein the first type of framing comprises ATM cells, and the second type of framing comprises segmentation of the packets according to a Layer 2 Tunneling Protocol L2TP over ATM.

11. The method of claim 8, wherein the higher layer session comprises a Point-to-Point Protocol PPP session.

12. The method of claim 11, wherein the step of providing information comprises including the information in a PPP packet.

13. The method of claim 1, including:

for data frames received at the intermediate device from the first end station carrying one or more of the channel parameters for the second channel, producing frames according to the second communication protocol using one or more of the channel parameters from the received data frames.

14. The method of claim 1, including:

for data frames received at the intermediate device from the second end station framed using one or more of the channel parameters for the second channel, producing frames according to the first communication protocol without stripping one or more of the channel parameters in the received data frames.

15. In a system including a network having one or more intermediate devices coupled to end stations by respective links, and through which a session is established from a first end station through an intermediate device in the network to a second end station, the network including a first segment operating according to a first communication protocol between the first end station and the intermediate device, and a second segment operating according to a second communication protocol between the intermediate device and the second end station, a method for improving network performance, comprising:

establishing a first channel on the first segment between the first end station and the intermediate device according to the first communication protocol for data frames originating in the first end station;

establishing a second channel on the second segment between the intermediate device and the second end station according to the second communication protocol for data frames originating in the first end station, including identifying channel parameters to be carried by data frames in the second channel;

providing information identifying one or more of the channel parameters for the second channel from the intermediate device to the first end station, enabling the first end station to at least one of apply one or more of the channel parameters to data frames in the first channel and remove one or more of the channel parameters from data frames in the first channel, to reduce processing in the intermediate device;

establishing a higher layer session between the first end station and the second end station, the first communication protocol comprising a first type of framing of packets for the higher layer session, and the second communication protocol comprises a second type of framing of packets for the higher layer protocol; and for data frames received at the intermediate device from the first end station carrying in combination with the packets for the higher layer session one or more of the channel parameters for the second channel, producing frames for packets of the higher layer protocol according to the second communication protocol using one or more of the channel parameters from the received data frames.

16. The method of claim 15, wherein the first communication protocol comprises ATM cells over ADSL and the first channel comprises an ATM Virtual Circuit over an ADSL line.

17. The method of claim 15, wherein the second communication protocol comprises ATM, and the second channel comprises an ATM virtual circuit.

18. The method of claim 17, wherein the second communication protocol comprises a tunneling protocol over the ATM virtual circuit.

19. The method of claim 15, wherein the first communication protocol comprises a datalink layer protocol.

20. The method of claim 15, wherein the first communication protocol comprises a datalink layer protocol; and the second communication protocol comprises a datalink layer protocol.

21. The method of claim 15, wherein the first communication protocol comprises PPP over ATM, and the second communication protocol comprises a Layer 2 Tunneling Protocol L2TP over ATM.

22. The method of claim 15, wherein the first type of framing comprises ATM cells, and the second type of framing comprises ATM cells.

23. The method of claim 15, wherein the first type of framing comprises PPP over ATM, and the second type of framing comprises segmentation of the packets according to a Layer 2 Tunneling Protocol L2TP over ATM.

24. The method of claim 15, wherein the higher layer session comprises a Point-to-Point Protocol PPP session.

25. The method of claim 24, wherein the step of providing information comprises including the information in a PPP packet.

26. The method of claim 15, including:
for data frames received at the intermediate device from the second end station framed using one or more of the channel parameters for the second channel, producing frames according to the first communication protocol without stripping one or more of the channel parameters in the received data frames.

27. In a system including a network having one or more intermediate devices coupled to end stations by respective links, and through which a session is established from a first end station through an intermediate device in the network to a second end station, the network including a first segment operating according to a first communication protocol between the first end station and the intermediate device, and a second segment operating according to a second communication protocol between the intermediate device and the second end station, a method for improving network performance, comprising:
receiving from the intermediate device a request to add a tag relating to the second communication protocol to packets transmitted by the first end station for the session; and
in response to the request, combining the tag with packets in the session, and sending combined tag and packet to the intermediate device in a frame according to the first communication protocol.

28. The method of claim 27, including:
receiving from the intermediate device a request to remove a tag relating to the second communication protocol from packets received from the intermediate device in the session; and
in response to the request, removing a tag from frames carrying packets in the session to recover the packet, and forwarding the packet to higher layer processing in the first end station.

29. The method of claim 27, wherein the first communication protocol comprises ATM cells, and the first channel comprises an ATM Virtual Circuit over an ADSL line.

30. The method of claim 27, wherein the second communication protocol comprises a tunneling protocol, and the tag comprises one or more parameters assigned according to the tunneling protocol.

31. The method of claim 27, wherein the first communication protocol comprises a datalink layer protocol.

32. The method of claim 27, wherein the first communication protocol comprises a datalink layer protocol; and the second communication protocol comprises a datalink layer protocol, and the tag comprises one or more parameters assigned according to the second communication protocol.

33. The method of claim 32, wherein the first communication protocol comprises PPP over ATM, and the second communication protocol comprises a Layer 2 Tunneling Protocol L2TP over ATM.

34. The method of claim 27, wherein the higher layer session comprises a Point-to-Point Protocol PPP session.

35. The method of claim 34, wherein the step of providing information comprises including the information in a PPP packet.

36. In a system including a network having one or more intermediate devices coupled to end stations coupled by respective links, and through which a point-to-point session is established from a first end station across a first link through a first intermediate device through the network to a second end station, the point to point session operating according to a communication protocol between the first and second end stations, and the network including a first segment operating according to a first communication protocol between the first end station and the intermediate device, and a second segment operating according to a second communication protocol between the intermediate device and the second end station, a method for improving network performance, comprising:
detecting in the intermediate device data frames carrying packets in the point-to-point session and formatted according to the first communication protocol;
encapsulating said packets in the intermediate device according to a second communication protocol for transmission to the second end station through the network, said encapsulating including one or more processing steps;
reconstructing packets encapsulated according to the second communication protocol destined to the first end station, and delivering the reconstructed data packets in frames formatted according to the first communication protocol to the first end station from the intermediate device, said reconstructing including one or more processing steps; and
transmitting from the intermediate device to the first end station information related to the second communication protocol in a frame formatted according to the first communication protocol carrying a packet formatted according to the point-to-point session, enabling the first end station to reduce the processing steps in at least one of said encapsulating and said reconstructing by processing data frames formatted according to the first communication protocol to extract packets for the point-to-point session.

37. The method of claim 36, wherein the point-to-point session comprises a session according to a Point to Point Protocol PPP.

38. The method of claim 37, wherein the data frames include a reserved field, and said transmitting includes sending a PPP packet from the intermediate device to the first end station, including a code in the reserved field indicating that a signal related to the second communication protocol is carried in the packet.

39. The method of claim 38, wherein the reserved field comprises a protocol field specified for PPP protocol identification functions.

40. The method of claim 36, wherein the second communication protocol comprises a layer 2 tunneling protocol L2TP.

41. The method of claim 36, wherein the processing steps in said encapsulating include generating encapsulation data and constructing frames including the encapsulation data, and wherein the information relating to the second communication protocol includes data enabling the first end station to provide at least a portion of the encapsulation data in combination with the packets in data frames formatted according to the first communication protocol.

42. The method of claim 36, wherein the processing steps in said reconstructing includes assembling data packets in frames formatted according to the first communication protocol which include control parameters from the encapsulation according to the second communication protocol, and wherein the information relating to the second communication protocol includes data enabling the first end station to remove the control parameters.

* * * * *